United States Patent
Wolf et al.

(10) Patent No.: US 8,968,128 B2
(45) Date of Patent: Mar. 3, 2015

(54) TENSIONING DEVICE FOR A BELT DRIVE AND ELECTRIC ENGINE WITH SUCH A TENSIONING DEVICE

(71) Applicants: Benjamin Wolf, Bubenreuth (DE); Stefan Mack, Erlangen (DE); Roland Arneth, Eggolsheim (DE); Bernd Hartmann, Weisendorf (DE); Christian Hauck, Altdorf (DE); Martin Rauch, Bamberg (DE)

(72) Inventors: Benjamin Wolf, Bubenreuth (DE); Stefan Mack, Erlangen (DE); Roland Arneth, Eggolsheim (DE); Bernd Hartmann, Weisendorf (DE); Christian Hauck, Altdorf (DE); Martin Rauch, Bamberg (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 225 days.

(21) Appl. No.: 13/654,871

(22) Filed: Oct. 18, 2012

(65) Prior Publication Data
US 2013/0095967 A1    Apr. 18, 2013

(30) Foreign Application Priority Data
Oct. 18, 2011    (DE) .......................... 10 2011 084 680

(51) Int. Cl.
*F16H 7/12* (2006.01)
*F16H 7/08* (2006.01)

(52) U.S. Cl.
CPC ...... *F16H 7/1281* (2013.01); *F16H 2007/0806* (2013.01); *F16H 2007/0874* (2013.01); *F16H 2007/0893* (2013.01)

USPC .......................................................... 474/135

(58) Field of Classification Search
CPC .......... F16H 7/1281; F16H 2007/0806; F16H 2007/0874; F16H 2007/0893
USPC .................................. 184/133, 134, 135, 138
See application file for complete search history.

(56) References Cited

U.S. PATENT DOCUMENTS

| | | | | |
|---|---|---|---|---|
| 6,648,783 | B1 * | 11/2003 | Bogner | 474/134 |
| 8,821,328 | B2 * | 9/2014 | Jud et al. | 474/134 |
| 2007/0037648 | A1 * | 2/2007 | Di Giacomo et al. | 474/134 |
| 2009/0298631 | A1 * | 12/2009 | Jud et al. | 474/237 |
| 2013/0040770 | A1 * | 2/2013 | Wolf et al. | 474/134 |
| 2013/0203535 | A1 * | 8/2013 | Mack et al. | 474/134 |
| 2013/0260932 | A1 * | 10/2013 | Adam et al. | 474/134 |

FOREIGN PATENT DOCUMENTS

| | | |
|---|---|---|
| DE | 19926615 | 12/2000 |
| DE | 102006019877 | 10/2007 |
| DE | 102008025552 | 12/2009 |
| DE | 102011082764 | 4/2012 |
| JP | 2010091027 | 4/2010 |

* cited by examiner

*Primary Examiner* — William E Dondero
*Assistant Examiner* — Robert T Reese
(74) *Attorney, Agent, or Firm* — Volpe and Koenig, P.C.

(57) ABSTRACT

A tensioning device (2) is provided for a starter generator drive belt of an internal combustion engine and a starter generator (1) equipped with such a tensioning device. It includes a tensioning housing (8, 8*a*, 8*b*) with two belt pulleys (6, 7) and a bearing support (9) fastened at the machine housing (3) of the starter generator, on which the tensioning housing is pivotally supported via a friction bearing.

7 Claims, 5 Drawing Sheets

TENSIONING DEVICE FOR A BELT DRIVE AND ELECTRIC ENGINE WITH SUCH A TENSIONING DEVICE

CROSS-REFERENCE TO RELATED APPLICATIONS

This application claims the benefit of German Patent Application No. 10 2011 084 680.8, filed Oct. 18, 2011, which is incorporated herein by reference as if fully set forth.

FIELD OF THE INVENTION

The invention relates to a tensioning device for a belt drive, comprising a continuously traveling belt, an electric engine with a machine housing, and a drive wheel and at least one additional driving wheel, which is connected via the belt with the drive wheel in a driving fashion, with the tensioning device comprising the following:
- a tensioning housing which is supported by a friction bearing, pivotal in reference to the machine housing about the axis of the drive wheel,
- two belt pulleys impinging the belt in its traveling direction upstream and downstream in reference to the drive wheel with a pre-tensioning force,
- a spring means generating the pre-tensioning force,
- and a tension arm supported in the tensioning housing, mobile against the force of the spring means, with one of the belt pulleys being supported on the tensioning arm and the other belt pulley being supported stationary on the tensioning housing.

The invention also relates to an electric engine equipped with such a tensioning device.

BACKGROUND

In belt drives with alternating driven and driving wheels and an according change from slack side to tight side the tightening of the slack side requires a tensioning device with two belt pulleys, which pre-stress the belt upstream and downstream in reference to the alternating driving and driven drive wheel. This typically but not mandatorily relates to a belt drive of an internal combustion engine with an electric engine in the form of a starter generator, which is not only driven by the internal combustion engine for the purpose of generating electricity but also drives the internal combustion engine in order to start it.

Tensioning devices of prior art, for example suggested in DE 199 26 615 A1, DE 10 2008 025 552 A1, and DE 10 2006 019 877 A1 each comprise a tensioning housing fastened at the starter generator and two tensioning arms supported therein in a mobile fashion, with their belt pulleys being impinged with a force in reference to each other by a spring means arranged between them in order to tighten the belt.

The tensioning device of the type mentioned at the outset, i.e. comprising only one tensioning arm supported mobile in the tensioning housing, on the one side, and a belt pulley fixed to the housing, on the other side, and an electric engine with such a tensioning device is known from the two papers DE 10 2011 082 764 A1 and DE 10 2011 082 330 A1 not preliminarily published. The friction of the friction bearing, considerably higher in reference to a roller bearing, allows in a simple fashion an adjustment of the friction moment, required for damping the oscillation of the tensioning housing swaying back and forth during operation, to a suitable level.

SUMMARY

In light of this background the present invention is based on the objective of further developing the construction of a tensioning device of the type mentioned at the outset and an electric engine equipped with such a tensioning device, particularly with regards to the friction bearing on the machine housing.

The solution here comprises with regards to the tensioning device that the tensioning device includes a bearing support axially spanning the tensioning housing, which is fastened on the one side on the machine housing and on the other side comprises a support position, which supports the tensioning housing via friction at the side of the drive wheel facing away from the machine housing. This constructive design allows fastening of the tensioning device as a completely pre-assembled unit with an integrated friction bearing to the electric engine, namely at the already assembled drive wheel. The fastening points to be provided at the electric engine for the tensioning device may be restricted in the preferred case of a screw connection to threaded bores or plug-in bolts in the machine housing.

The support position of the bearing carrier may be embodied as a bearing pin, extending from a face of the bearing support, axially neighboring the tensioning housing, to the tensioning housing and supported in a friction bearing fashion on the bearing bore of the tension housing. The support occurs beneficially by a friction bearing socket arranged between the bearing pin and the bearing bore. It preferably comprises polyamide with dry lubricant embedded therein in the form of PTFE (polytetra fluoroethylene).

Furthermore, the friction bearing socket represents a collar bush, with a radially outwardly extending collar not only serving as a radial friction bearing but also as an axial friction bearing acting in one direction. In the other axial direction of the tensioning housing the axial friction bearing may be formed by a annular bush bearing, arranged between the axial faces of the tensioning housing, on the one side, and the bearing support, on the other side.

With regards to an axial design of the tensioning device as compact as possible the bearing pin should be embodied, at least at the side of the tensioning housing, as a hollow cylinder, so that the interior of the bearing pin serves to receive the axial screw connection of the drive wheel on the electric engine when the tensioning device is mounted on the electric engine. This axial interlacing of the components, in addition to the particularly compact design, also shows the advantage that the lever arm between the belt level, i.e. the belt pulleys, and the friction bearing can be kept as small as possible and consequently the friction bearing is largely free from traverse forces additionally to be compensated.

In case of an assembly of the electric engine and the tensioning device the belt pulley, supported locally fixed on the tensioning housing, shall be arranged upstream in reference to the drive wheel in the traveling direction of the belt. In this arrangement of the belt pulleys the tipping risk of the belt sections approaching the drive wheel of the electric engine, associated with striking acoustics and increased wear and tear, is considerably lower than in the inverse arrangement of the belt pulley, because when the belt pulley is arranged fixed in the housing the bearing play between the tensioning arm and the belt pulley promoting the belt tipping is not given.

BRIEF DESCRIPTION OF THE DRAWINGS

An exemplary embodiment of the invention, described in the following, is shown in the drawings. Shown are.

DETAILED DESCRIPTION OF THE PREFERRED EMBODIMENTS

Figure 1:
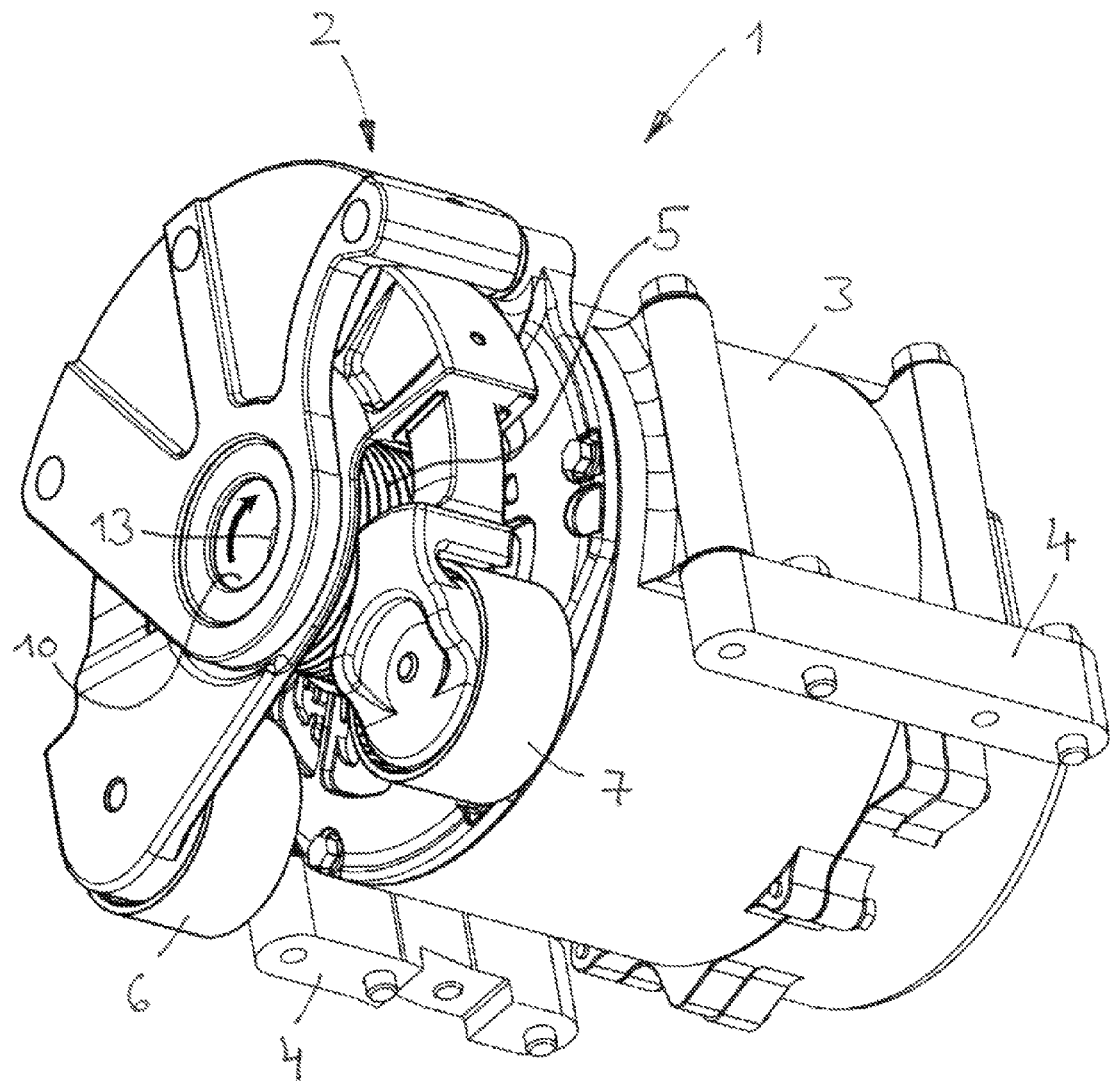
FIG. 1 is a perspective overall view of an electric engine according to the invention with a tensioning device assembled thereon.

The electric engine 1 shown in FIG. 1 represents a starter generator of an ancillary belt drive of an internal combustion engine, with the starter generator 1 being combined with a tensioning device 2 for a poly-V-belt (not shown) continuously traveling. The starter generator 1 comprises a generally cylindrical machine housing 3, which is here screwed via adapters 4 to the internal combustion engine. A drive wheel 5 runs on the front side of the machine housing 3, which can be screwed to a central drive shaft (not discernible), connected via the belt at least to the crankshaft drive wheel (not shown either) of the internal combustion engine in a driving connection.

The crankshaft drive wheel is driven in a manner known per se to start the internal combustion engine by the drive wheel 5 of the starter generator 1, and in order to drive in a started internal combustion engine the drive wheel 5 for the generation of electricity. The drive wheel 5 accordingly alternating emits and/or receives torque causing a synchronous change of slack side and tight side in the belt drive, which shows the travel direction of the belt marked by the arrow near the drive wheel 5. In the starting operation of the internal combustion engine the V-belt leg represents the tight side, which extends in the travel direction upstream in reference to the driving wheel 5 and the V-belt leg represents the slack side, which extends in the travel direction downstream in reference to the drive wheel 5. Inversely, in the generator operation the V-belt leg represents the slack side, which extends in the travel direction upstream in reference to the then driven drive wheel 5 and the V-belt leg represents the tight side, which extends in the travel direction downstream in reference to the drive wheel 5.

The tensioning device 2 is fastened at the front side on the machine housing 3 and comprises two belt pulleys 6 and 7, which impinge the belt in its travel direction upstream and/or downstream in reference to the drive wheel 5 with a pre-tensioning force in order to tighten the alternating slack sides of the belt drive.

In the following the constructive design of the tensioning device 2 is explained based on FIGS. 2 through 10.

Figure 2:
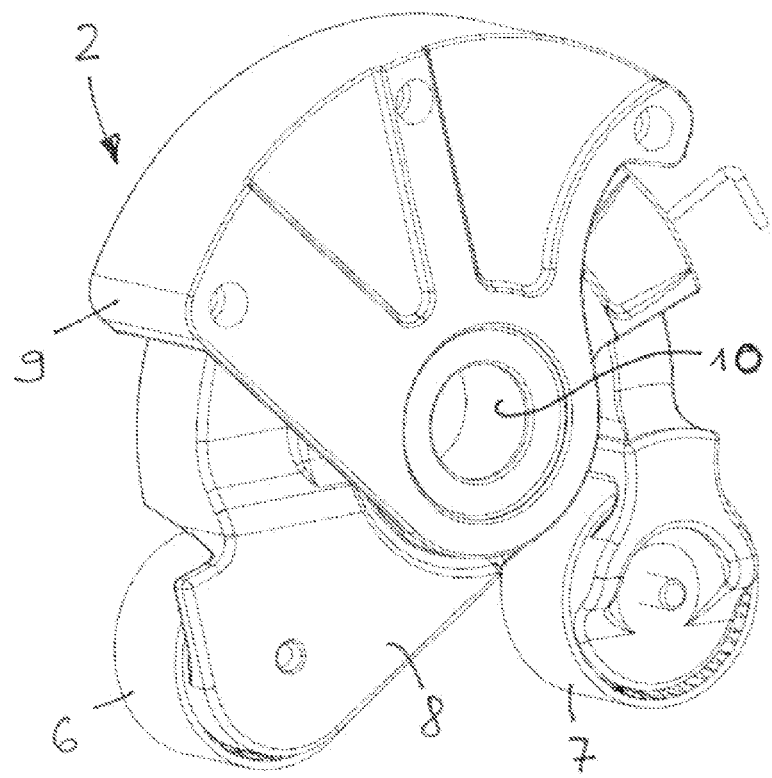
FIG. 2 is a perspective front view of the bearing support of the tensioning device according to FIG. 1.
Figure 3:
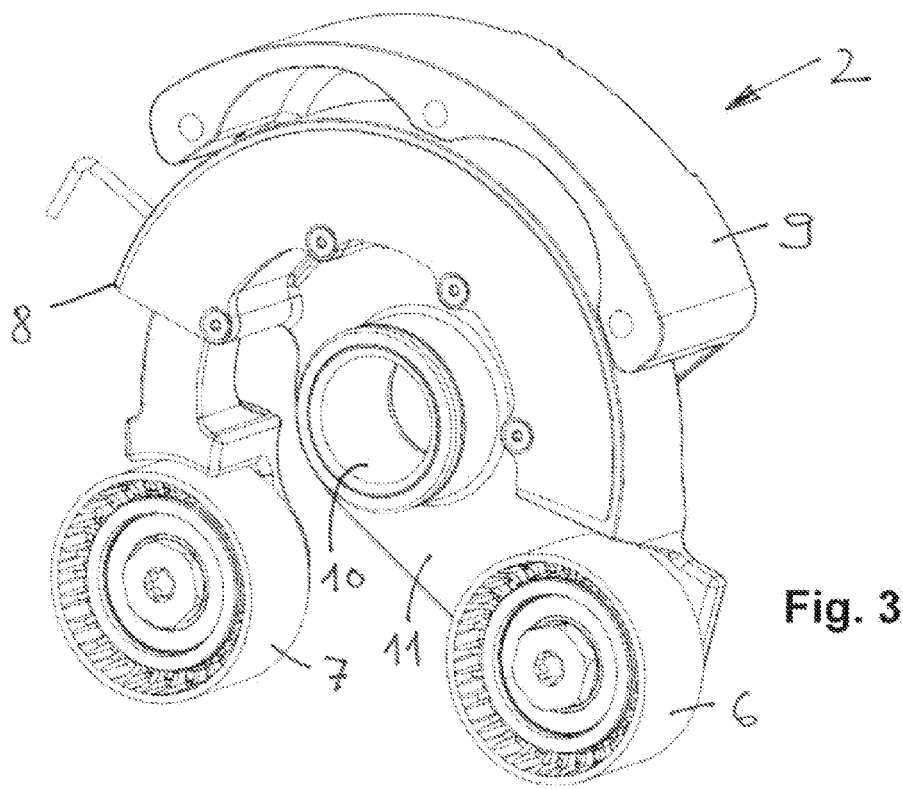
FIG. 3 is a perspective rear view of the tensioning housing of the tensioning device according to FIGS. 1 and 2.
Figure 4:
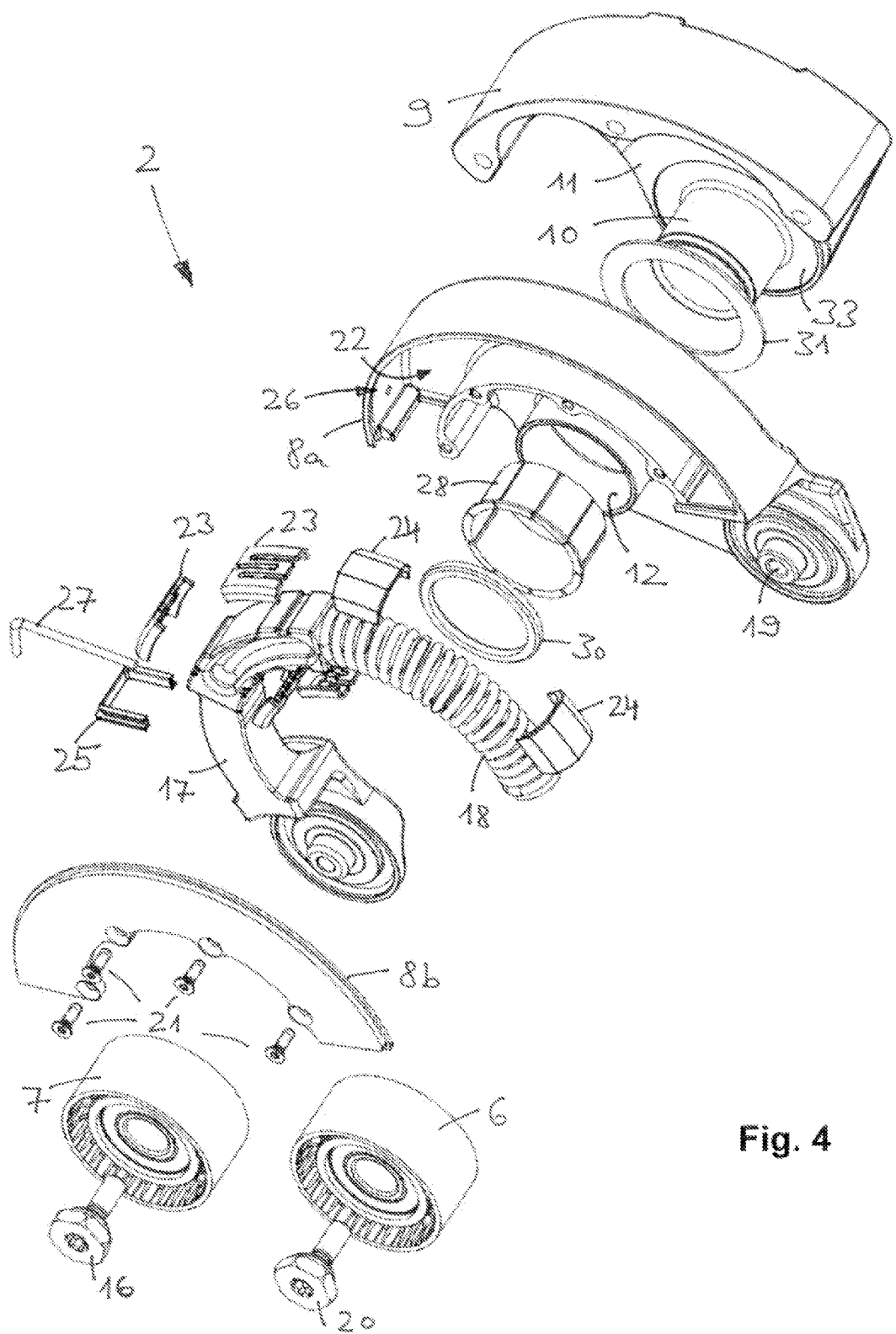
FIG. 4 is an exploded view of the tensioning device according to FIGS. 1 through 3.

FIGS. 2 through 4 show the tensioning device 2 as a structural component prior to its assembly on the electric engine in the assembled state (FIGS. 2 and 3) and/or in an exploded illustration (FIG. 4). The tensioning device 2 comprises a tensioning housing 8 and a bearing support 9 with a support position 10, on which the tensioning housing 8 with the belt pulleys 6, 7 is frictionally supported in a pivotal fashion. The support position 10 represents a bearing pin, which extends from a facial wall 11 of the bearing support 9, axially adjacent to the tensioning housing 8, towards the tensioning housing 8. The tensioning housing 8 is received with a bearing bore 12 via the friction bearing, explained in the following, on the bearing pin 10. As also discernible from the assembly according to FIG. 1 the cylindrical bearing pin 10 is throughout hollow and extends concentrically in reference to the drive wheel 5. This means on the one hand that the pivotal bearing of the tensioning device 2 and the rotary axis of the drive wheel 5 are coaxial, and on the other hand this is conditional for the axial screw-connection 13 of the drive wheel 5 (only partially discernible as a corner of the axial nut) is received inside the bearing pin 10 in a space-saving fashion.

Figure 5:
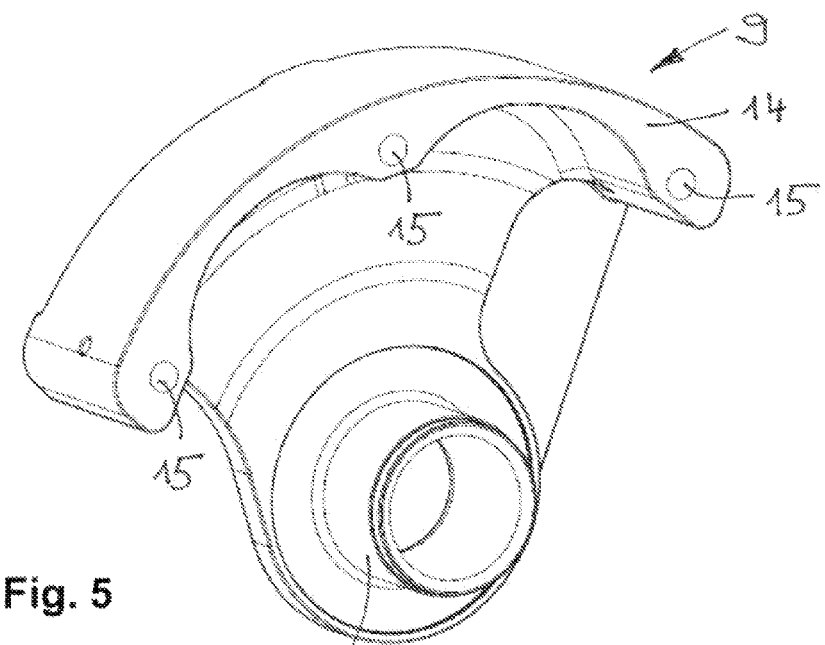
FIG. 5 is an enlarged view of the bearing support from FIG. 4.

FIG. 5 shows the bearing support 9 as an individual part: due to the fact that the support position 10 extends at the side of the drive wheel 5 facing away from the machine housing 3 (also see FIG. 1), the bearing support 9 spans over the tensioning housing 8 axially with a screwed-on flange 14, which is embodied according to the cylindrical shape of the machine housing 3 in an essentially arc-shaped fashion. The fastening of the bearing support 9 at the front of the machine housing 3 occurs via a screw connection to three fastening points 15 (the screw-connection itself is not shown in FIG. 1).

The belt pulley 7, arranged in the traveling direction of the belt downstream in reference to the drive wheel 5, is supported via an axial screw 16 on a tensioning arm 17, with its arc-shaped arm section being supported articulate about the rotary axis of the drive wheel 5 in the tensioning housing 7 against a spring means generating the pre-stressing force. Opposite thereto the belt pulley 6 is supported stationary on the tensioning housing 8. For this purpose it is provided with a threaded bore 19 into which the axial screw 20 of the belt pulley 6 is screwed.

The pivotal friction bearing of the tensioning housing 8 allows that when changing the operation of the starter generator 1 and an appropriate change from the tight side to the slack side in the drive belt of the tensioning housing 8 is pivoted with the belt pulleys 6, 7 about the rotary axis of the drive wheel 5. For example, if the starter generator 1 changes from the starter operation to the generator operation at the housing side the V-belt leg changes the mobile belt pulley 7 from the slack side to the tight side and with regards to the belt pulley 6 stationary fixed at the housing from the tight side to the slack side. Consequently this change of operation leads to a pivoting of the tensioning housing 8 from the then given tight V-belt leg at the belt pulley 7 to the then given slack V-belt leg at the belt pulley 6, i.e. in the marked travel direction of the belt according to FIG. 1 to a deflection opposite the travel direction. Here, the pre-stressing force in the belt drive is always maintained by the arc spring 18, which impinges the tensioning arm 17 with pressure from the tensioning housing 8.

This operation of the tensioning device 2, i.e. the tightening pivoting into the respectively given slack V-belt leg, also leads to a so-called decoupling of the rotating starter generator mass from the crankshaft of the internal combustion engine. This decoupling is usually performed by a decoupler at the generator (e.g., an overriding generator pulley) or at the crankshaft, which in conventional generator machines without a starter mode is arranged on the generator shaft and/or the crankshaft and uncouples the relatively inertly rotating generator mass from the crankshaft, when its rotation gradient is negative. This means, the tensioning device 2 according to the invention can also be used in conventional generator belt drives (without a starter mode) alternatively or supplementary to the decoupler.

Figure 6:
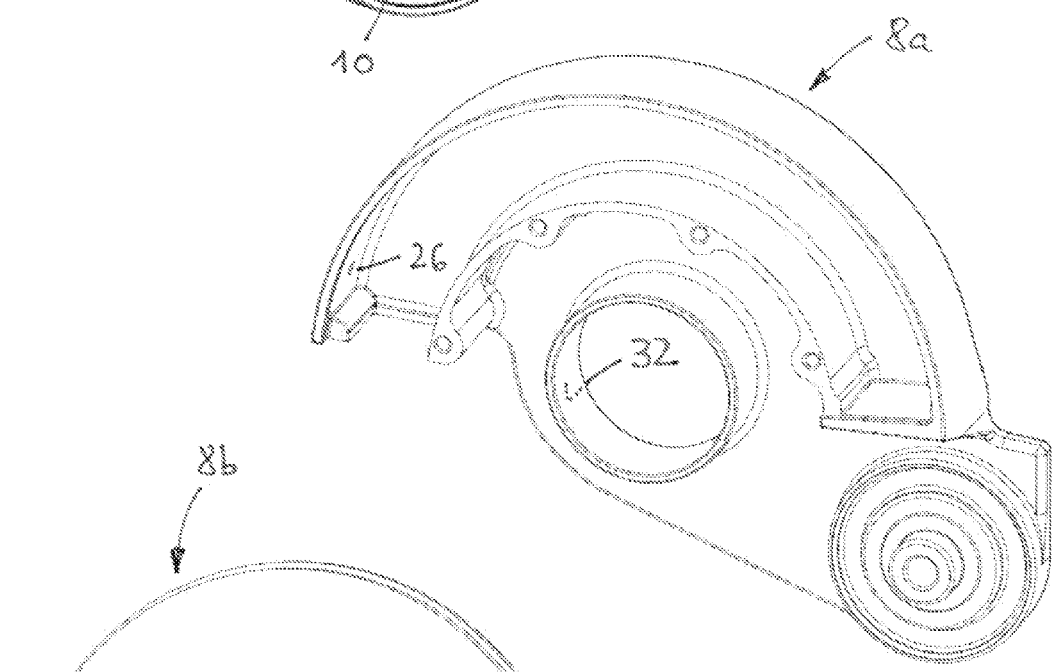
FIG. 6 is an enlarged view of a first tensioning housing part from FIG. 4.
Figure 7:
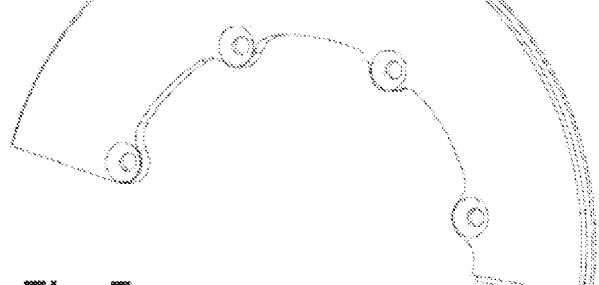
FIG. 7 is an enlarged view of a second tensioning housing part from FIG. 4.

As also discernible in FIGS. 6 and 7, the tensioning housing 8 comprises a tensioning housing part 8a and a second tensioning housing part 8b fastened thereat via the screw connection 21 (four screws in FIG. 4), together with the tensioning housing part 8a limiting an arc-shaped operating chamber 22, rectangular in its cross-section, for the tensioning arm 17 and the arc spring 18. The bearing and the damping of oscillations of the tensioning arm 17 and the arc spring 18 in reference to the tensioning housing 8 occurs via friction bearing cups 23 and/or 24. The tensioning housing part 8a is provided with a sealing lip 25, which protects the receiving chamber 22 from dirt particles penetrating into it. The safety pin 27 inserted through the housing bore 26 into a tensioning arm bore (not shown) serves as an assembly safety, which fixes the tensioning arm 17 in a pre-stressed transportation position before the belt drive is assembled.

Figure 8:
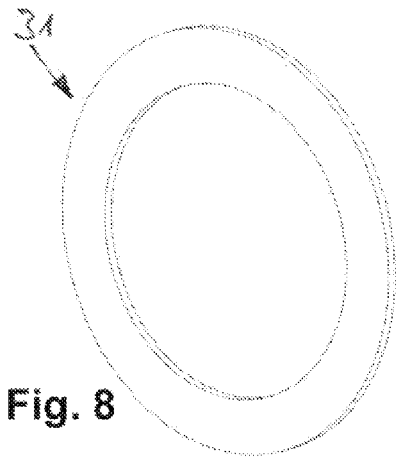
FIG. 8 is an enlarged view of an annular friction bearing from FIG. 4.
Figure 9:
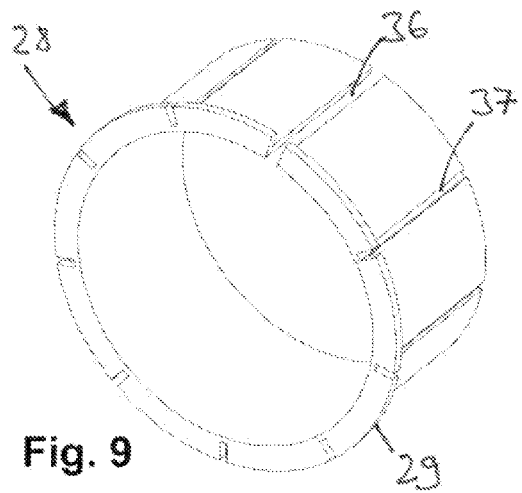
FIG. 9 is an enlarged view of a friction bearing socket from FIG. 4.
Figure 10:
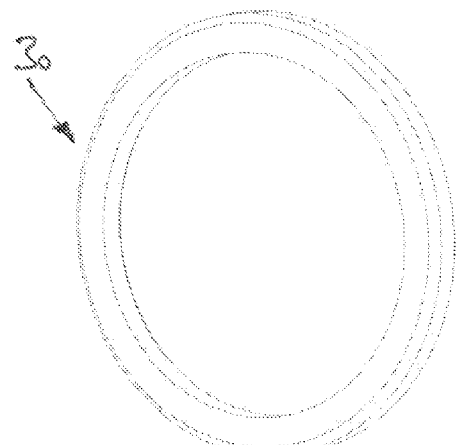
FIG. 10 is an enlarged view of an axial safety ring from FIG. 4.

As discernible from FIG. 4 in connection with FIGS. 8 through 10 the friction bearing of the tensioning housing 8 comprises on the bearing pin 10 of the bearing support 9 a friction bearing socket 28 arranged in the annular space between the bearing pin 10 and the bearing bore 12. It serves not only for the radial friction support but also with a radially outwardly extending collar 29 for an axial friction support of the tensioning housing 8 in the direction of the machine housing 3. The tensioning housing 8 and the collar bush 28 are supported in this direction on an axial safety ring 30, which is pressed onto the free end of the bearing pin 10. The axial friction bearing of the tensioning housing 8 in the opposite direction, i.e. towards the bearing support 9, occurs via a friction bearing ring 31, which is arranged between the axial bearing areas 32 and 33 of the tensioning housing 8 on the one side (see FIG. 6) and/or the bearing support 9 on the other side.

Figure 11:
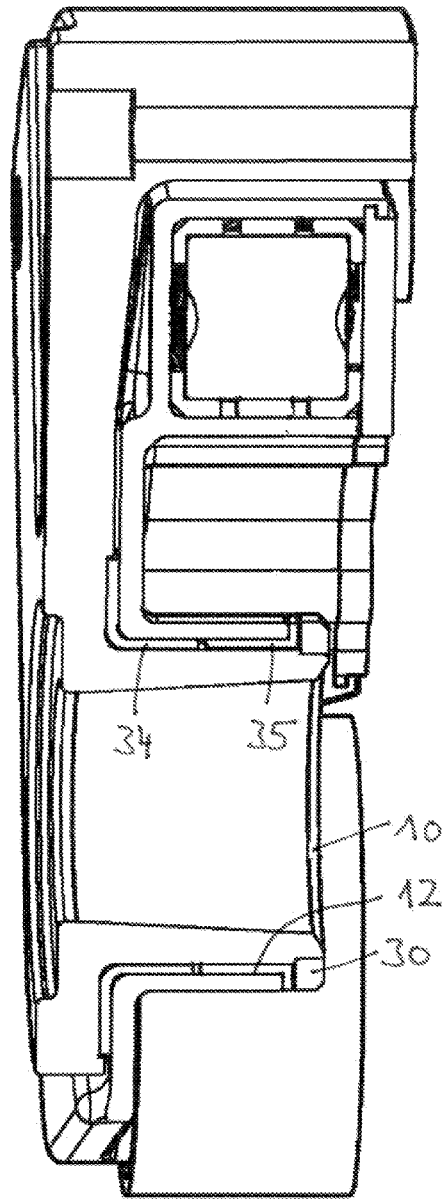
FIG. 11 is a longitudinal cross-sectional view of the tensioning device with a modified friction bearing.

The assembly of the friction bearing is implemented with slightly modified bearing means of FIG. 11: unlike the friction bearing socket 28 and the friction bearing ring 31 here two collar bushings 34 and 35 are used. The general design of the two friction bearings is identical, though, and the axial safety ring 30 is clearly discernible, which is pressed onto the free end of the bearing pin 10 projecting in reference to the bearing bore 12.

The collar bushings 28, 34, and 35 and the friction bearing ring 31 are each made from a heat-resistant polyamide PA66 with a dry lubricant embedded therein in the form of PTFE. The collar bush 28 is provided with a continuous longitudinal slot 36 for a simplified assembly and for compensating production tolerances. Eight longitudinal grooves 37, extending along the exterior perimeter, serve to collect any bearing output developing during operation.

The axial safety ring 30 and the bearing support 9 are made from steel, while the tensioning housing 8 is assembled from cast aluminum parts. The materials shown in the exemplary embodiment may be replaced with other materials suitable with regards to function and production costs for other embodiments of the tensioning device 2.

LIST OF REFERENCE CHARACTERS 1 electric engine/starter generator
2 tensioning device
3 machine housing
4 adapter
5 drive wheel
6 stationary belt pulley
7 mobile belt pulley
8 tensioning housing
9 bearing support
10 support location/bearing pin
11 facial wall of the bearing support
12 bearing bore of the tensioning housing
13 axial screw connection of the drive wheel
14 flange of the bearing support for a screw connection
15 fastening point of the bearing support
16 axial screw of the mobile belt pulley
17 tensioning arm
18 spring means/ground spring
19 threaded bore for the axial screw of the fixed belt pulley
20 axial screw of the fixed belt pulley
21 screw connection of the tensioning housing
22 receiving chamber
23 friction bearing cup of the tensioning arm
24 friction bearing cup of the arc spring
25 sealing lip
26 housing bore for the safety pin
27 safety pin
28 friction bearing socket/collar bush
29 collar of the friction bearing socket
30 axial safety ring
31 friction bearing ring
32 axial bearing area of the tensioning housing
33 axial bearing area of the bearing support
34 collar bush
35 collar bush
36 longitudinal slot
37 longitudinal groove

The invention claimed is:

1. A tensioning device for a belt drive, comprising a continuously traveling belt, an electric engine (1) with a machine housing (3) and a drive wheel (5) and at least one additional drive wheel, which is in a driving connection via the belt to the drive wheel (5), with the tensioning device (2) comprising the following:
 a tensioning housing (8, 8a, 8b), which is supported via a friction bearing, pivotal about an axis of the drive wheel (5) in reference to the machine housing (3),
 two belt pulleys (6, 7) impinging the belt in a traveling direction with a pre-stressing force upstream and downstream in reference to the drive wheel (5),
 a spring (18) adapted to generate a pre-stressing force,
 and a tensioning arm (17) supported in the tensioning housing (8, 8a, 8b) articulate against a force of the spring (18),
 one of the belt pulleys (7) is supported on the tensioning arm (17) and the other belt pulley (6) is supported stationary on the tensioning housing (8, 8a, 8b), and
 a bearing support (9) axially spanning the tensioning housing (8, 8a, 8b), which is fastened on one side to the machine housing (3) and on the other side comprises a support position (10), which supports the tensioning housing (8, 8a, 8b) via friction at a side of the drive wheel (5) facing away from the machine housing (3).

2. A tensioning device according to claim 1, wherein the support position (10) of the bearing support (9) comprises a bearing pin, which extends from a facial wall (11) of the bearing support (9) extending axially neighboring the tensioning housing (8, 8a, 8b) to the tensioning housing (8, 8a, 8b) and is received in a bearing bore (12) of the tensioning housing (8, 8a, 8b).

3. A tensioning device according to claim 2, wherein a friction bearing of the tensioning housing (8, 8a, 8b) in a radial direction is formed by a friction bearing socket (28, 34, 35) arranged between the bearing pin (10) and the bearing bore (12).

4. A tensioning device according to claim 3, wherein the friction bearing socket (28) with a collar (29) extending radially outwardly is embodied as a collar bush for frictional support of the tensioning housing (8, 8a, 8b) in one of its axial directions.

5. A tensioning device according to claim 4, wherein the friction bearing of the tensioning housing (8, 8a, 8b) in its other axial direction is embodied by a friction bearing ring (31) arranged in second axial bearing areas (32, 33) of the tensioning housing (8, 8a, 8b) on one side and the bearing support (9) on the other side.

6. A tensioning device according to claim 2, wherein the bearing pin (10) is embodied at least at a side of the tensioning housing (8, 8a, 8b) as a hollow cylinder so that an interior of the bearing pin (10) serves to receive an axial screw connection (13) of the drive wheel (5) on the electric engine (10) when the tensioning device (2) is assembled on the electric engine (1).

7. An electric engine (1) with a tensioning device (2) fastened thereon according to claim 1, wherein the belt pulley (6) supported stationary on the tensioning housing (8, 8a, 8b) is arranged upstream in reference to the drive wheel (5) in a travel direction of the belt.

* * * * *